United States Patent
Lee

(10) Patent No.: US 10,976,560 B2
(45) Date of Patent: Apr. 13, 2021

(54) NAVIGATION DEVICE, ILLUMINATION SYSTEM AND LIGHT BEAM SHAPING OPTICS THEREOF

(71) Applicant: PixArt Imaging Inc., Hsin-Chu County (TW)

(72) Inventor: Sai-Mun Lee, Penang (MY)

(73) Assignee: PIXART IMAGING INC., Hsin-Chu County (TW)

(*) Notice: Subject to any disclaimer, the term of this patent is extended or adjusted under 35 U.S.C. 154(b) by 239 days.

(21) Appl. No.: 16/045,745

(22) Filed: Jul. 26, 2018

(65) Prior Publication Data

US 2020/0033611 A1 Jan. 30, 2020

(51) Int. Cl.
G02B 27/09 (2006.01)
G06F 3/03 (2006.01)
G06F 3/0354 (2013.01)

(52) U.S. Cl.
CPC ..... G02B 27/0916 (2013.01); G02B 27/0905 (2013.01); G02B 27/0955 (2013.01); *G06F 3/0304* (2013.01); *G06F 3/03543* (2013.01)

(58) Field of Classification Search
CPC ............ G02B 27/0916; G02B 27/0955; G02B 27/0905; G06F 3/03543; G06F 3/0304; G06F 3/0317; G06F 3/03547; G06F 3/042; G06F 3/0354; H01L 27/167; H01L 27/14618
See application file for complete search history.

(56) References Cited

U.S. PATENT DOCUMENTS

| | | | | |
|---|---|---|---|---|
| 6,301,216 B1* | 10/2001 | Takahashi | ............ | G11B 7/0909 369/112.28 |
| 9,218,069 B2* | 12/2015 | Lee | ............ | G06F 3/0321 |
| 2005/0024624 A1* | 2/2005 | Gruhlke | ............ | G06F 3/0421 356/3.01 |
| 2005/0094154 A1* | 5/2005 | Baney | ............ | G06F 3/03544 356/499 |
| 2005/0231465 A1* | 10/2005 | DePue | ............ | G06F 3/0317 345/156 |
| 2005/0231482 A1* | 10/2005 | Theytaz | ............ | G06F 3/0317 345/166 |
| 2007/0285392 A1* | 12/2007 | Lee | ............ | G06F 3/0317 345/166 |

* cited by examiner

*Primary Examiner* — Jennifer D Bennett
(74) *Attorney, Agent, or Firm* — Hauptman Ham, LLP

(57) ABSTRACT

There is provided an illumination system of a navigation device including a light beam shaping optics, and a first light source and a second light source having different characteristics. The light beam shaping optics is used to shape light beams emitted by the first light source and the second light source to illuminate a work surface with substantially identical incident angles and/or beam sizes.

17 Claims, 2 Drawing Sheets

NAVIGATION DEVICE, ILLUMINATION SYSTEM AND LIGHT BEAM SHAPING OPTICS THEREOF

BACKGROUND

1. Field of the Disclosure

This disclosure generally relates to a navigation device and, more particularly, to a navigation device having multiple light sources with different characteristics as well as an illumination system and a light beam shaping optics thereof. The light beam shaping optics is to cause the multiple light sources to illuminate a work surface with substantially identical incident angles.

2. Description of the Related Art

An optical navigation device generally includes a light source, an image sensor and a processor. The light source is used to illuminate a work surface. The image sensor is used to detect reflected light from the work surface. The processor is used to calculate movement with respect to the work surface according to image features in the image frames captured by the image sensor.

For example referring to FIG. 1, it is a schematic diagram of a conventional optical navigation device 9. In addition to a light source 91 and an image sensor 93, the optical navigation device 9 further includes a light guiding element 95 used to direct light emitted by the light source 91 to a work surface S, and then direct reflected light from the work surface S to the image sensor 93.

In some conditions, the optical navigation device 9 may need multiple light sources. In this case, as the multiple light sources have different disposed positions and even have different illumination characteristics such as different emission angles and different wavelengths, the conventional light guiding element 95 is not suitable to guide light beams emitted by different light sources at the same time.

Accordingly, it is necessary to provide an illumination system that is able to guide light beams emitted from different light sources to have substantially identical incident angles to maintain the sensing efficiency of the image sensor 93 corresponding to different light sources.

SUMMARY

The present disclosure provides a navigation device as well as an illumination system and a light beam shaping optics thereof that cause light beams emitted by multiple light sources with different characteristics to have substantially identical incident angles and/or beam sizes corresponding to a work surface to increase the adaptable work surfaces and applications.

The present disclosure further provides a navigation device as well as an illumination system and a light beam shaping optics thereof that arrange an individual shaping mechanism corresponding to each of different light sources.

The present disclosure provides an illumination system of a navigation device. The navigation device is configured to be operated on a work surface. The illumination system includes a first light source, a second light source and a light beam shaping optics. The first light source has a first emission angle and is configured to emit a first light beam of a first wavelength. The second light source has a second emission angle and is configured to emit a second light beam of a second wavelength. The light beam shaping optics is configured to shape the first light beam and the second light beam to cause the first light beam and the second light beam to have at least one of identical incident angles and identical beam sizes corresponding to the work surface after passing through the light beam shaping optics.

The present disclosure further provides a light beam shaping optics of a navigation device. The light beam shaping optics is configured to shape light beams passing therethrough and includes a first shaping mechanism, a second shaping mechanism and a third shaping mechanism. The first shaping mechanism is located at a first side of the light beam shaping optics and configured to receive a first light beam. The second shaping mechanism is located at the first side of the light beam shaping optics and configured to receive a second light beam. The third shaping mechanism is located at a second side of the light beam shaping optics and configured to output the first light beam and the second light beam. A shaping effect of the first shaping mechanism on the first light beam is different from that of the second shaping mechanism on the second light beam, and the third shaping mechanism has an identical shaping effect on the first light beam and the second light beam.

The present disclosure further provides a navigation device configured to be operated on a work surface. The navigation device includes a substrate, a light emitting diode, a laser diode and a light beam shaping optics. The light emitting diode is arranged on the substrate, and configured to emit a first light beam of a first wavelength. The laser diode is arranged on the substrate, and configured to emit a second light beam of a second wavelength. The light beam shaping optics is configured to shape the first light beam and the second light beam to cause the first light beam and the second light beam to have at least one of identical incident angles and identical beam sizes corresponding to the work surface after passing through the light beam shaping optics.

The present disclosure further provides an illumination system of a navigation device. The navigation device is configured to be operated on a work surface. The illumination system includes a substrate, a first light source, a second light source and a light beam shaping optics. The first light source is disposed on the substrate, has a first emission angle and is configured to emit a first light beam of a first wavelength. The second light source is disposed on the substrate, has a second emission angle and is configured to emit a second light beam of a second wavelength. The light beam shaping optics has a first light input surface, a second light input surface and an output surface, wherein the first light beam and the second light beam are transmitted to the first light input surface and the second light input surface respectively, and the first light beam and the second light beam are transmitted out of the output surface.

In the navigation device as well as an illumination system and a light beam shaping optics thereof of the present disclosure, different characteristics of the light sources are referred to, for example, different wavelengths, different degrees of coherence, different emission angles, different intensities or the like. Different light beam shaping mechanisms have different shaping effects on light beams.

The light beam shaping optics is preferably formed integrally to simultaneously have the first shaping mechanism, the second shaping mechanism, the third shaping mechanism and the reflected light shaping mechanism. Other parts of the light beam shaping optics such as legs arranged on the device casing or those combined to other components of the navigation device are formed integrally with the above shaping mechanisms or combined to the above shaping mechanisms via glue.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2:
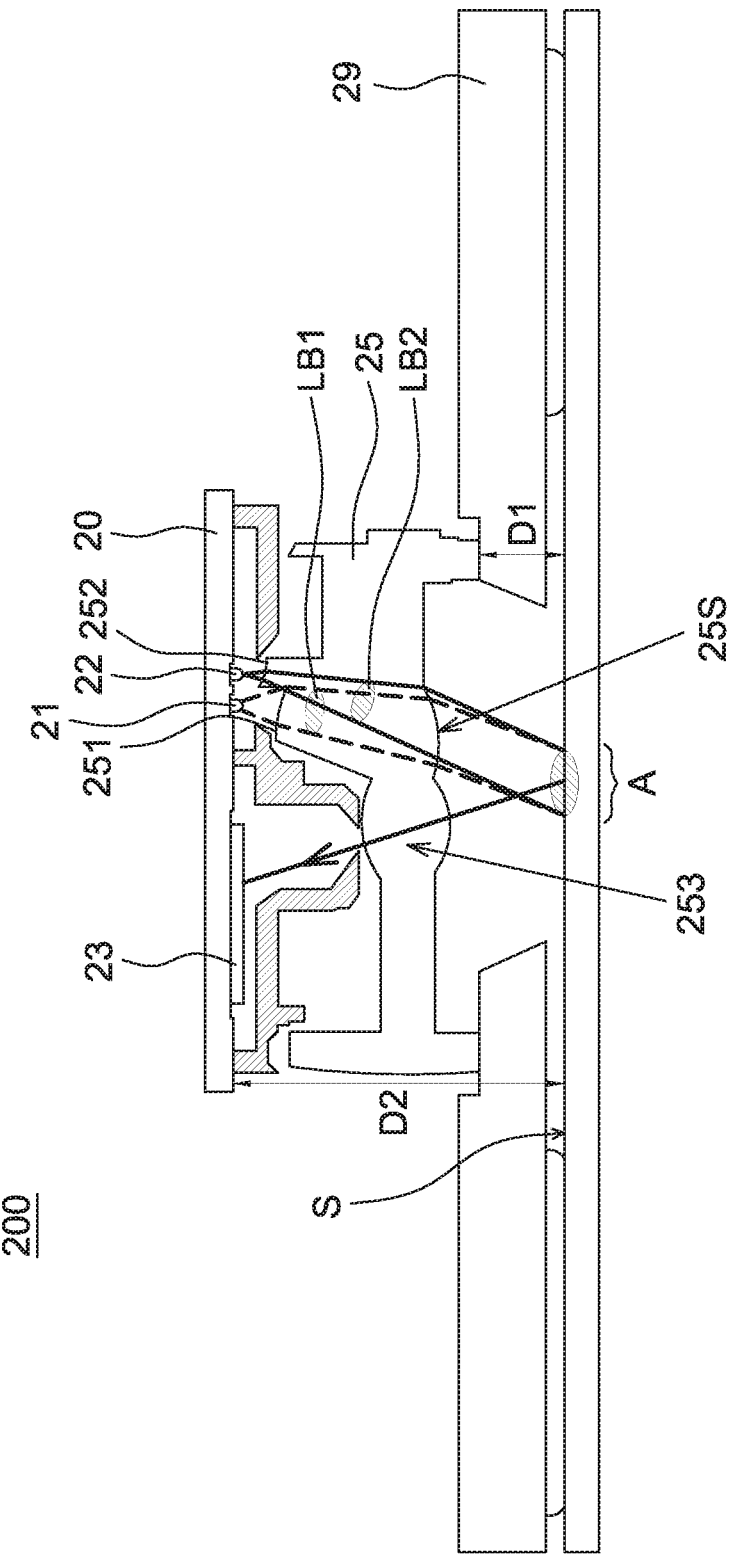
FIG. 2 is a schematic diagram of a navigation device as well as an illumination system and a light beam shaping optics thereof according to one embodiment of the present disclosure.

Referring to FIG. 2, it is a schematic diagram of a navigation device 200 as well as an illumination system and a light beam shaping optics thereof according to one embodiment of the present disclosure. The navigation device 200 includes an illumination system, an image sensor 23 and a casing 29, wherein FIG. 2 only shows a lower part and omits other parts of the casing 29 for simplification purposes. The illumination system is arranged inside the casing 29 to be protected thereby and arranged on a lower part of the casing 29.

For example, the navigation device 200 is an electronic device such as an optical mouse or a cleaning robot which is operated on a work surfaces S. In other embodiments, the work surface S moves with respect to the navigation device 200 such as an optical finger navigation mouse. Accordingly, the work surface S is a table surface, a ground surface or a finger surface according to different applications. The navigation device 200 further includes a processor (not shown) such as a central processing unit (CPU), a microcontroller unit (MCU) or an application specific integrated circuit (ASIC) for calculating a moving trace thereof with respect to the work surface S.

The illumination system includes a substrate 20, a first light source 21, a second light source 22 and a light beam shaping optics 25 arranged opposite to the substrate 20. In addition, the navigation device 200 further includes an image sensor 23, which is a CCD image sensor, a CMOS image sensor or the like, for outputting image frames at a predetermined frequency. The image sensor 23 is arranged on the substrate 20 for detecting a reflected first light beam and a reflected second light beam which are reflected by the work surface S and penetrate the light beam shaping optics 25. For simplification purposes, the reflected first light beam and the reflected second light beam are shown by their propagation direction in FIG. 2.

The substrate 20 is a printed circuit board (PCB), a flexible circuit board (FCB) or the like for arranging the first light source 21, the second light source 22, the image sensor 23, the processor and other active/passive elements thereon. Generally, the substrate 20 is separated from the work surface S by a predetermined distance D2. The predetermined distance D2 is preferably determined before shipment so as to determine every optical parameter of the light beam shaping optics 25.

The first light source 21 is disposed on the substrate 20, has a first emission angle and emits a first light beam LB1 of a first wavelength. The first light beam LB1 penetrates the light beam shaping optics 25 to illuminate a region of interest (ROI) A on the work surface S. The first light source 21 is a light emitting diode (LED), a laser diode (e.g., VCSEL, but not limited to) or other partially coherent light sources.

The second light source 22 is disposed on the substrate 20, has a second emission angle and emits a second light beam LB2 of a second wavelength. The second light beam LB2 penetrates the light beam shaping optics 25 to illuminate the region of interest A on the work surface S. The second light source 22 is a light emitting diode (LED), a laser diode (e.g., VCSEL, but not limited to) or other partially coherent light sources.

It is appreciated that a part of light emitted by the first light source 21 and the second light source 22 does not propagate along the first light beam LB1 and the second light beam LB2. In the present disclosure, the first light beam LB1 and the second light beam LB2 are referred to a main beam emitted by the first light source 21 and the second light source 22.

In one non-limiting embodiment, a first emission angle of the first light source 21 is identical to a second emission angle of the second light source 22, e.g., the first light source 21 and the second light source 22 are a same type (e.g., both are LEDs or laser diodes) to have substantially identical emission angles. However, a first wavelength (i.e. a domain wavelength thereof) of the first light source 21 is different from a second wavelength (i.e. a domain wavelength thereof) of the second light source 22. In some embodiments, light of different wavelengths are adapted to illuminate a work surface of different materials and generate different reflection effects. The first wavelength and the second wavelength are falling within a range of, for example, red light and/or infrared light.

In another non-limiting embodiment, a first emission angle of the first light source 21 is different from a second emission angle of the second light source 22, e.g., the first light source 21 and the second light source 22 are different types of light sources. Meanwhile, a domain wavelength of the first light source 21 is different from a domain wavelength of the second light source 22.

In another non-limiting embodiment, a first emission angle of the first light source 21 is different from a second emission angle of the second light source 22; whereas, a domain wavelength of the first light source 21 is identical to a domain wavelength of the second light source 22. In some embodiments, different emission angles indicate that the first and second light sources have different emission intensities or degrees of coherence to be adapted to work surfaces of different materials and generate different reflection effects.

The light beam shaping optics 25 is used to shape the first light beam LB1 and the second light beam LB2 to cause the first light beam LB1 and the second light beam LB2 to have substantially identical incident angles and/or identical beam sizes corresponding to the work surface S after passing through the light beam shaping optics 25. Or, after leaving the light beam shaping optics 25, the first light beam LB1 and the second light beam LB2 have substantially identical beam sizes and/or propagation directions. In the present disclosure, said shaping is referred to modifying a size and/or a propagation direction of a light beam.

In one non-limiting embodiment, the light beam shaping optics 25 has a first shaping mechanism 251, a second shaping mechanism 252, a third shaping mechanism 25S and a reflected light shaping mechanism 253.

The first shaping mechanism 251 is located at a first side (e.g., the upper side in FIG. 2) of the light beam shaping optics 25 and has a first input surface opposite to the first light source 21 to receive a first light beam LB1 emitted by the first light source 21. After passing through the first shaping mechanism 251 and the light beam shaping optics 25, the first light beam LB1 is emergent from the light beam shaping optics 25 via an output surface of the third shaping mechanism 25S. In FIG. 2, the first shaping mechanism 251 is shown to extrude from the first side surface of the light beam shaping optics 25 to have a light converging effect, but the present disclosure is not limited thereto. Corresponding to different first light sources 21, the first shaping mechanism 251 has a flat surface or a concave surface.

The second shaping mechanism 252 is located at the first side of the light beam shaping optics 25 and has a second light input surface opposite to the second light source 22 to receive a second light beam LB2 emitted by the second light source 22. After passing through the second shaping mechanism 252 and the light beam shaping optics 25, the second light beam LB2 is emergent from the light beam shaping optics 25 via an output surface of the third shaping mechanism 25S. In FIG. 2, the second shaping mechanism 252 is shown sinking from the first side surface of the light beam shaping optics 25 to a have light expansion effect, but the present disclosure is not limited thereto. Corresponding to different second light sources 22, the second shaping mechanism 252 has a flat surface or a convex surface.

In this embodiment, the first light beam LB1 and the second light beam LB2 are transmitted to the first light input surface and the second light input surface respectively, and the first light beam LB1 and the second light beam LB2 in the light beam shaping optics 25 are transmitted out of the output surface to the work surface S.

The third shaping mechanism 25S is located at a second side (e.g., the lower side in FIG. 2) of the light beam shaping optics 25 and opposite to the work surface S to output the first light beam LB1 and the second light beam LB2. Preferably, an area of the third shaping mechanism 25S is larger than the first light beam LB1 and the second light beam LB2. In FIG. 2, the third shaping mechanism 25S is shown to extrude from the second side surface of the light beam shaping optics 25 to have a light converging effect, but the present disclosure is not limited thereto. Corresponding to different first shaping mechanisms 251 and second shaping mechanisms 252, the third shaping mechanism 25S has a flat surface or a concave surface.

In the present disclosure, as the first light source 21 and the second light source 22 are located at different positions and have different characteristics (e.g., different emission angles, dominant wavelengths and degrees of coherence), a shaping effect of the first shaping mechanism 251 on the first light beam LB1 is different from that of the second shaping mechanism 252 on the second light beam LB2 to cause the shaped light beams to have similar beam sizes and/or propagation directions. For example, one of the first shaping mechanism 251 and the second shaping mechanism 252 is used to expand the light beam and the other one of the first shaping mechanism 251 and the second shaping mechanism 252 is used to condense the light beam.

In addition, in order to allow the first light beam LB1 and the second light beam LB2 to reach the third shaping mechanism 25S, at least one following arrangement is selected. (1) The first shaping mechanism 251 and the second shaping mechanism 252 have different heights on the first side of the light beam shaping optics 25 to have different distances from the first light source 21 and the second light source 22; and (2) the first shaping mechanism 251 and the second shaping mechanism 252 have different tilt angles on the first side of the light beam shaping optics 25, wherein the tile angle is determined according to a relative position between shaping mechanisms, a thickness of the light beam shaping optics 25, light source characteristics and so on under the condition that the distances D1 and D2 are fixed.

As the first light beam LB1 and the second light beam LB2 both leave the light beam shaping optics 25 via the third shaping mechanism 25S, the third shaping mechanism 25S has substantially identical shaping effects on the first light beam LB1 and the second light beam LB2. That is, in the present disclosure, the light beam shaping optics 25 manipulates light beams of different characteristics have substantially identical sizes and propagation directions using the first shaping mechanism 251 and the second shaping mechanism 252, and the third shaping mechanism 25S is to direct emergent light to the region of interest A. The expected size of the region of interest A can influence the arrangement of the third shaping mechanism 25S.

The reflected light shaping mechanism 253 is, for example, a biconvex lens to shape the reflected first light beam and the reflected second light beam to be effectively detected by the image sensor 23. In one non-limiting embodiment, the reflected first light beam and the reflected second light beam preferably go through a center of the reflected light shaping mechanism 253 such that even if the reflected first light beam and the reflected second light beam have different wavelengths, the refraction does not occur in the reflected light shaping mechanism 253. That is, as long as the first light beam LB1 and the second light beam LB2 have substantially identical incident angles with respect to the work surface S, the reflected light thereof impinges on the image sensor 23 in a substantially identical propagation direction. In addition, it is possible that the reflected light shaping mechanism 253 is arranged as a biconcave lens or other types depending on the size of the region of interest A.

Referring to FIG. 2 again, in one non-limiting embodiment, the first light source 21 is a light emitting diode for emitting a first light beam LB1 of a first wavelength, and the second light source 22 is a laser diode for emitting a second light beam LB2 of a second wavelength. The first shaping mechanism 231 is opposite to the light emitting diode. The second shaping mechanism 252 is opposite to the laser diode. As the light emitting diode generally has a larger emission angle than that of the laser diode, the first shaping mechanism 231 is arranged to condense the first light beam LB1, and the second shaping mechanism 252 is arranged to expand the second light beam LB2 to allow the shaped first light beam and the shaped second light beam to have beam sizes close to each other.

In FIG. 2, the first shaping mechanism 251 is shown to have a distance from the light emitting diode farther than a distance between the second shaping mechanism 252 and the laser diode, but it is only intended to illustrate but not to limit the present disclosure. If the first shaping mechanism 251 is selected to have a distance from the light emitting diode closer than the distance between the second shaping mechanism 252 and the laser diode, the curvature, cross section and tilt angle of the first shaping mechanism 251 and the second shaping mechanism 252 are changed correspondingly to allow the first light beam LB1 and the second light beam LB2 to propagate to the third shaping mechanism 25S.

It should be mentioned that although FIG. 2 shows that the first light source 21 and the second light source 22 are arranged along a first direction (e.g., a left-right direction in FIG. 2) from the image sensor 23 on the substrate 20, and the first light source 21 is closer to the image sensor 23 than the second light source 22, it is only intended to illustrate but not to limit the present disclosure.

In another non-limiting embodiment, the first light source 21 is arranged to be farther from the image sensor 23 than the second light source 22. Or, the first light source 21 and the second light source 22 have substantially identical distances from the image sensor 23. In this case, positions and tile angles of the shaping mechanisms corresponding to the first light source 21 and the second light source 22 are changed accordingly.

The light beam shaping optics 25 is arranged on the casing 29, e.g., FIG. 2 showing that the light beam shaping optics 25 has legs carried by the bottom part of the casing 29. In manufacturing the light beam shaping optics 25, a distance D2 between the substrate 20 and the work surface S as well as a thickness of the casing 29 (e.g., distance D1) are preferably fixed values such that the optical features of the first shaping mechanism 251, the second shaping mechanism 252, the third shaping mechanism 25S and the reflected light shaping mechanism 253 are determined according to a position of the region of interest A within the opening of the bottom part of the casing 29. Said optical features include the scaling ratio of light beam (e.g., curvature), the refraction angle, the tilt angle, the distance from the light source, the distance from the work surface S, the distance from the image sensor 23 and so on.

It should be mentioned that although FIG. 2 shows that the first light source 21 and the second light source 22 are within a same space (e.g., surrounded by opaque components), the present disclosure is not limited thereto. In another non-limiting embodiment, the first light source 21 and the second light source 22 are respectively in different spaces, e.g., a light blocking member is arranged between the first light source 21 and the second light source 22 to prevent the light interference therebetween.

It should be mentioned that although FIG. 2 shows that the first light beam LB1 and the second light beam LB2 are not reflected inside the light beam shaping optics 25 and directly leave the light beam shaping optics 25 via the third shaping mechanism 25S, the present disclosure is not limited thereto. In one non-limiting embodiment, at least one of the first light beam LB1 and the second light beam LB2 is reflected at least one time inside the light beam shaping optics 25 and then goes out the light beam shaping optics 25 from the third shaping mechanism 25S. The emergent first light beam LB1 and second light beam LB2 have substantially identical beam sizes and/or propagation directions after leaving the light beam shaping optics 25.

It should be mentioned that although FIG. 2 shows that the light beam shaping optics 25 is an integrally formed transparent (transparent to the first light source 21 and the second light source 22) glass product or plastic product, the present disclosure is not limited thereto. In one non-limiting embodiment, the light beam shaping optics 25 includes more than one (e.g., one corresponding to each light source) separated transparent shaping optics to cause the first light beam LB1 and the second light beam LB2 to have substantially identical incident angles and/or beam sides while impinging on the work surface S.

In addition, the navigation device 200 further includes light blocking member (e.g., the part filled with oblique lines) surrounding the first light source 21, the second light source 22 and the image sensor 23 to prevent the interference from stray light.

In other embodiments, the navigation device 200 includes more than two light sources, and the light beam shaping optics 25 includes multiple shaping mechanisms respectively corresponding to said multiple light sources to cause the light beams emitted by said multiple light sources to have substantially identical incident angles and/or beam sides to illuminate the region of interest A on the work surface S.

The method of controlling the image sensor 23 to capture image frames corresponding to the lighting (simultaneously or sequentially) of the first light source 21 and the second light source 22 is known to the art and not an object of the instant application, and thus details thereof are not described herein.

Figure 1:
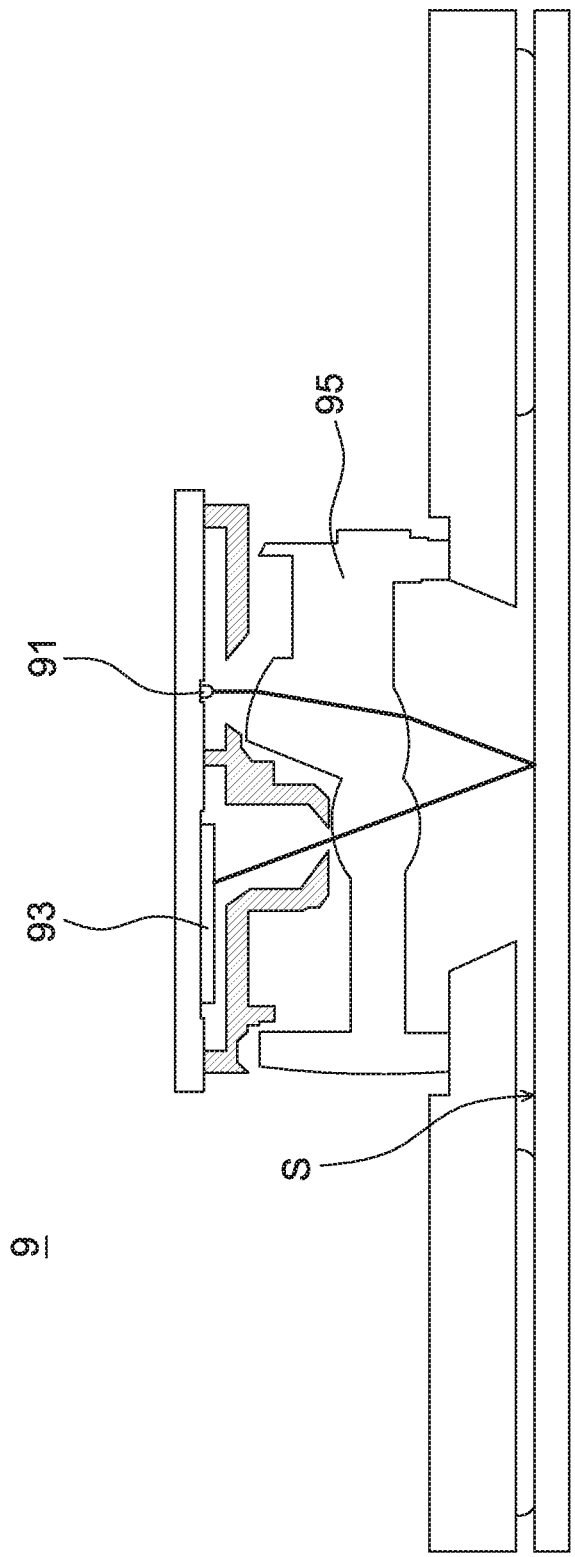
FIG. 1 is a schematic diagram of a conventional optical navigation device.

As mentioned above, the conventional optical navigation device includes a single illumination channel (as shown in FIG. 1) and thus the application thereof is limited. Accordingly, the present disclosure further provides a navigation device as well as an illumination system and a light beam shaping optics thereof (e.g. FIG. 2) that have multiple illumination channels and corresponding light beam shaping mechanisms. Multiple light beams of the multiple illumination channels are manipulated to have substantially identical divergence angles and incident angles after passing through the light beam shaping mechanisms thereby broadening applicable environment.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An illumination system of a navigation device, the navigation device being configured to be operated on a work surface, the illumination system comprising:
   a first light source having a first emission angle and configured to emit a first light beam of a first wavelength;
   a second light source having a second emission angle and configured to emit a second light beam of a second wavelength; and
   a light beam shaping optics configured to shape the first light beam and the second light beam to cause the first light beam and the second light beam to have at least one of identical incident angles and identical beam sizes corresponding to the work surface after passing through the light beam shaping optics, wherein the light beam shaping optics comprises:
   a first shaping mechanism opposite to the first light source;
   a second shaping mechanism opposite to the second light source,
   wherein a distance between the first shaping mechanism and the first light source is different from that between the second shaping mechanism and the second light source.

2. The illumination system as claimed in claim 1, wherein the first emission angle is identical to the second emission angle, and
the first wavelength is different from the second wavelength.

3. The illumination system as claimed in claim 1, wherein the first emission angle is different from the second emission angle, and
the first wavelength is different from the second wavelength.

4. The illumination system as claimed in claim 1, wherein the first emission angle is different from the second emission angle, and
the first wavelength is identical to the second wavelength.

5. The illumination system as claimed in claim 1, further comprising:
a substrate; and
an image sensor disposed on the substrate, and configured to detect a reflected first light beam and a reflected second light beam reflected by the work surface and penetrating the light beam shaping optics,
wherein the first light source and the second light source are arranged on the substrate along a first direction from the image sensor, and have different distances from the image sensor.

6. The illumination system as claimed in claim 5, wherein the light beam shaping optics further comprises:
a third shaping mechanism opposite to the work surface, wherein
a shaping effect of the first shaping mechanism on the first light beam is different from that of the second shaping mechanism on the second light beam, and the third shaping mechanism has an identical shaping effect on the first light beam and the second light beam.

7. The illumination system as claimed in claim 5, wherein the substrate is separated from the work surface by a predetermined distance.

8. The illumination system as claimed in claim 5, wherein the light beam shaping optics further comprises a reflected light shaping mechanism configured to shape the reflected first light beam and the reflected second light beam.

9. A light beam shaping optics of a navigation device, the light beam shaping optics configured to shape light beams passing there through and comprising:
a first shaping mechanism located at a first side of the light beam shaping optics and configured to receive a first light beam;
a second shaping mechanism located at the first side of the light beam shaping optics and configured to receive a second light beam; and
a third shaping mechanism located at a second side of the light beam shaping optics and configured to output the first light beam and the second light beam, wherein
a shaping effect of the first shaping mechanism on the first light beam is different from that of the second shaping mechanism on the second light beam, and the third shaping mechanism has an identical shaping effect on the first light beam and the second light beam,
wherein one of the first and second shaping mechanisms is configured for light beam expansion, and the other one of the first and second shaping mechanisms is configured for light beam convergence.

10. The light beam shaping optics as claimed in claim 9, wherein the first shaping mechanism and the second shaping mechanism have different heights on the first side of the light beam shaping optics.

11. The light beam shaping optics as claimed in claim 9, wherein the first shaping mechanism and the second shaping mechanism have different tilt angles on the first side of the light beam shaping optics.

12. The light beam shaping optics as claimed in claim 9, wherein the light beam shaping optics is a glass product or a plastic product.

13. A navigation device, configured to be operated on a work surface, the navigation device comprising:
a substrate;
a light emitting diode arranged on the substrate, and configured to emit a first light beam of a first wavelength;
a laser diode arranged on the substrate, and configured to emit a second light beam of a second wavelength; and
a light beam shaping optics configured to shape the first light beam and the second light beam to cause the first light beam and the second light beam to have at least one of identical incident angles and identical beam sizes corresponding to the work surface after passing through the light beam shaping optics, wherein the light beam shaping optics comprises:
a first shaping mechanism opposite to the light emitting diode; and
a second shaping mechanism opposite to the laser diode,
wherein the first shaping mechanism is configured to condense the first light beam, and the second shaping mechanism is configured to expand the second light beam.

14. The navigation device as claimed in claim 13, wherein the first wavelength is different from the second wavelength.

15. The navigation device as claimed in claim 13, wherein the first wavelength is identical to the second wavelength.

16. The navigation device as claimed in claim 13, wherein a distance between the first shaping mechanism and the light emitting diode is different from that between the second shaping mechanism and the laser diode.

17. The navigation device as claimed in claim 13, further comprising:
an image sensor arranged on the substrate, and configured to detect a reflected first light beam and a reflected second light beam reflected by the work surface and penetrating the light beam shaping optics,
wherein the light emitting diode and the laser diode are arranged on the substrate along a first direction from the image sensor, and have different distances from the image sensor.

* * * * *